Dec. 12, 1950 — C. GABEL — 2,533,573
TRACTOR SEAT HAVING SPRING MOUNTING
Filed Aug. 19, 1947
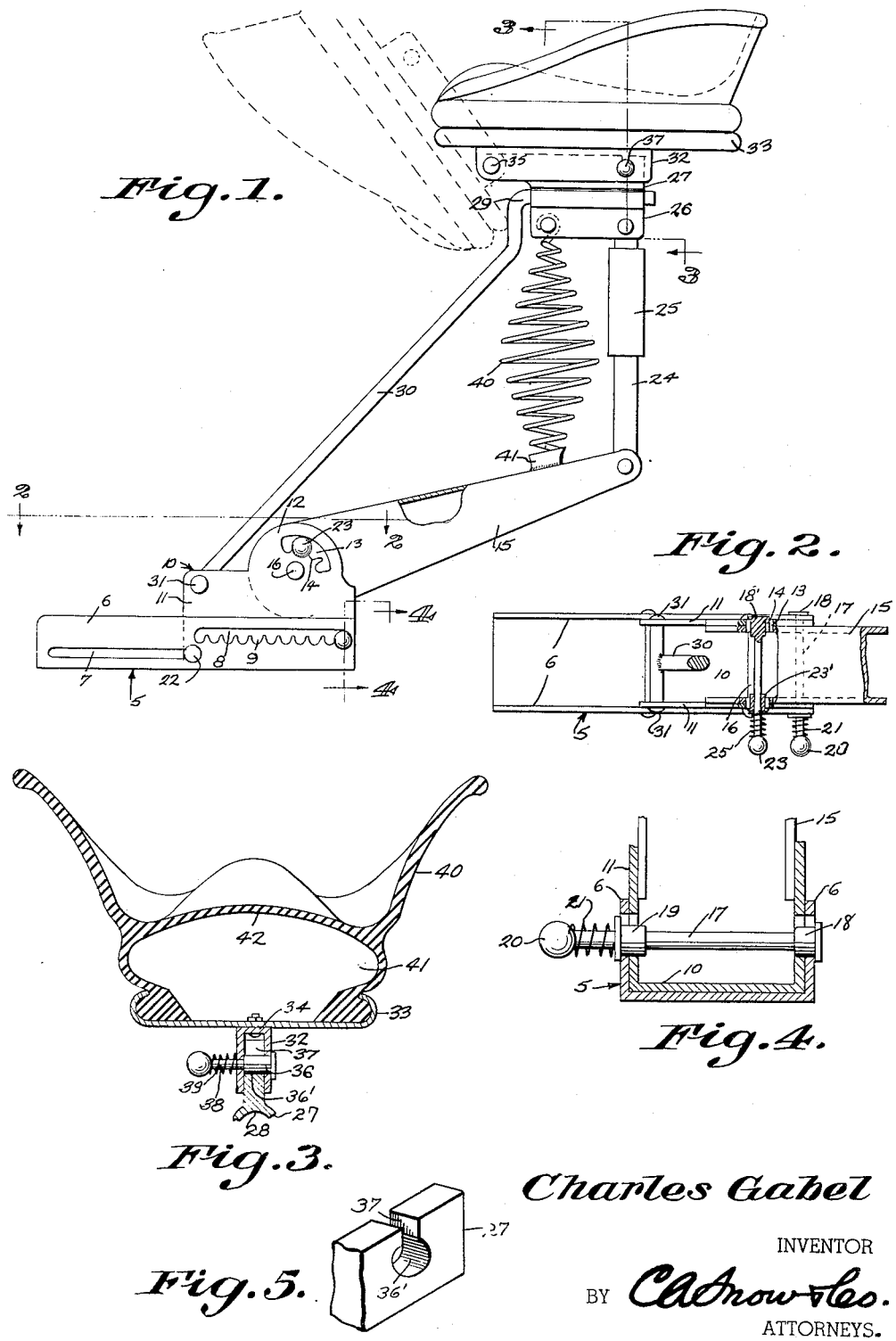
Charles Gabel
INVENTOR Patented Dec. 12, 1950

2,533,573

UNITED STATES PATENT OFFICE 2,533,573

TRACTOR SEAT HAVING SPRING MOUNTING

Charles Gabel, Hawkeye, Iowa

Application August 19, 1947, Serial No. 769,428

5 Claims. (Cl. 155—51)

This invention relates to seat construction, and particularly to seat construction used on tractors, or similar farm machinery.

An important object of the invention is to provide a seat of this character having cushioning means for cushioning the movements of the seat when the tractor equipped with the seat, is moving over rough or irregular surfaces.

Still another object of the invention is to provide means whereby the height of the tractor seat may be adjusted readily, thereby adapting the seat for use by persons of various sizes and heights.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawing

Figure 1 is a side elevational view of a seat constructed in accordance with the invention, the seat being illustrated in dotted lines as tilted forwardly to the position for protecting the seat against the elements.

Figure 2 is a sectional view taken on line 2—2 of Figure 1.

Figure 3 is a sectional view taken on line 3—3 of Figure 1.

Figure 4 is a sectional view taken on line 4—4 of Figure 1.

Figure 5 is a detail view illustrating the construction of the notch in which the seat locking pin moves.

Referring to the drawing in detail, the reference character 5 indicates the base of the tractor seat, which is formed preferably of heavy sheet metal material constructed to provide longitudinal flanges 6, which flanges are spaced apart and formed along the side edges of the base.

These flanges are provided with elongated openings 7 elongated longitudinally of the flanges, and elongated openings 8 also elongated longitudinally of the flanges, the openings 8 being disposed slightly above the openings 7 and the lower edge of the opening 8 at one side of the base is provided with notches 9.

The base also includes the upper movable section 10 which is substantially U-shape in formation, the upper section being slightly narrower than the base proper, so that it closely fits within the base proper, the flanges 11 thereof and which extend longitudinally of the upper section, being substantially wide to extend an appreciable distance above the upper edges of the flanges 6.

The flanges 11 of the upper section of the base are formed with enlarged portions 12 that have their upper edges curved in the arcs of circles, the enlarger portions 12 having curved openings 13 curved in the arcs of circles, as clearly shown by Figure 1 of the drawings. The lower edge of the opening 13 at one side of the upper section is formed with notches 14.

These enlarged portions provide a support for the main arm 15 of the seat structure, which main arm is constructed of a length of sheet metal material, bent to provide longitudinal flanges along its side edges, the flanges tapering towards the upper end of the main arm 15.

The main arm is pivotally connected with the enlarged portions 12 of the upper section 10, by means of the pin 16 which is shown as extending through openings in the enlarged portions 12, and lower end of the flanges of the main arm 15.

Operating within the elongated openings 8 and disposed in notches 9 of the lower section 10 of the base, is a rod 17 which is provided with a head 18 to prevent the rod from being drawn through the openings 8. Mounted on the rod 17 for sliding movement is a flanged sliding collar 19, which flange prevents movement of the collar inwardly, along the rod 17.

As shown, the rod 17 is of a length to extend an appreciable distance beyond the flange of the collar 19, where it is provided with a knob 20 against which the spring 21 engages, the opposite end of the spring engaging the flange of the collar 19. Thus, it will be seen that due to this construction, the rod 17 is held in its adjusted positions, until it is desired to move the rod, in which case, the rod 17 is forced inwardly against the action of the spring 21 releasing the head 18 of the rod for further adjustment, whereupon the rod is released and the head will snap into place to hold the upper section of the base in position with respect to the main portion 5 of the base.

The headed pin 22 connects with the upper section of the base and is disposed in the elongated openings 7, the pin sliding in the elongated openings as the upper section is moved longitudinally of the main section of the base.

Secured to the arm 15 is a spring-pressed pin 23 that extends through the openings 13 of the enlarged portions 12. The collar 23' mounted on the pin 23, is moved into contact with the outer surface of the enlarged portion 12 at one side of the section 10, by means of the coiled spring 25'.

Secured to the opposite end of the pin 23 is the head 18' that moves within the opening 13 at the opposite side of the section 10, the head 18' engaging the outer surface of the section 10, and in the notches 14 in adjacent opening 13. Thus it will be seen that by moving the pin 23 from one notch to another, the arm 15 may be adjusted to various angular positions with respect to the base 5 of the tractor seat.

The arm 15 has pivotal connection with the rod 24 that moves into the cylinder 25 that in turn is pivotally mounted between the flanges 26 of the coupling 27 which coupling 27 is formed with a central circular portion 28 disposed longitudinally thereof, into which the upper end 29 of the rod 30 is disposed, the lower end of rod 30 being pivotally connected with the upper section 11 of the base, at 31.

The upper end of the coupling 27 is pivotally mounted between spaced flanges 32 that extend downwardly from the bottom plate 33 of the seat, which is bolted to the plate 34 of which the flanges 32 form a part.

The flanges 32 are pivotally connected to the coupling 27, by means of the pin 35, there being provided a spring-pressed pin 36 mounted in openings formed in the flanges 32, the pin 36 being designed to move into the vertical notch 37 formed in the upper edge of the coupling. Thus, it will be seen that due to this construction, the seat plate 33 and seat 38 mounted thereon, may swing forwardly to the dotted line position when not in use, so that the seat will be out of the way and protected against the elements.

The construction of the notch is such that it is not sufficiently wide to permit the large portion of the pin 36 to enter between the walls thereof, as the seat swings downwardly, however the notch 37 is formed with a circular opening at its base which is of a diameter to receive the pin 36 after the reduced portion of pin 36 has been moved to a position over the notch to clear the coupling when the seat is being positioned for use, thereby locking the seat against movement when in use. When positioning the seat for use, the small or reduced portion of the pin 36 is moved through the notch 37, the pin being pressed laterally against the action of the spring 39. The seat may now be swung downwardly, and when the pin is released to the action of the spring 39, the large portion of the pin will be drawn into the lower circular portion of the notch 37, securing and locking the seat in position.

A coiled spring indicated by the reference character 40 has its lower end seated in the cup 41 carried by the main arm 15, while the opposite end thereof is secured to the coupling 27, between the flanges 26 thereof.

This spring will act to cushion the vertical movements of the seat and return the seat to its normal position.

The seat proper indicated by the reference character 40, is constructed preferably of rubber, and has an air chamber 41 cushioning the bottom 42 of the seat.

The flanges of the seat proper extend an appreciable distance above the bottom of the seat providing an ample rest for the comfort of the user of the seat.

From the foregoing, it will be seen that due to the construction shown and described, I have provided a seat for use in connection with tractors or other farm machinery, which will be exceptionally comfortable for the user, and one which will counteract the movements directed to the seat by the tractor moving over rough or irregular surfaces.

What is claimed is:

1. A tractor seat comprising a base including a lower section adapted for securing to a tractor, and an upper section mounted on the lower section, the upper section being adjustable longitudinally of the lower section, means for holding the upper section in its positions of adjustment on the lower section, a main arm pivotally and adjustably connected to the upper section of the base, means for securing the main arm in its positions of adjustment, a rod pivotally connected to the free end of the main arm, a cylinder into which the rod extends, a seat section, a coupling between the seat section and cylinder, and a spring disposed between the coupling and main arm, cushioning vertical movement of the seat with respect to the main arm.

2. A tractor seat comprising a base adapted to be secured to a tractor, said base including a stationary lower section and a movable upper section having curved openings formed therein, the wall of the opening at one side of the upper sections having notches, means for securing the upper section in various positions of adjustment longitudinally of the lower section, a seat including a lower plate, a pair of spaced flanges secured to the plate, a coupling pivotally mounted between the flanges, means for securing the flanges and seat to the coupling against pivotal movement, linkage connected with the coupling and upper section of the base, pivotally connecting the seat to the base, a pin carried by the linkage and engageable with said notches securing the linkage in various positions of adjustment, and a spring disposed between the coupling and linkage for normally holding the seat in a horizontal position.

3. A tractor seat comprising a base adapted to be positioned on a tractor, a seat, a coupling to which the seat is pivotally connected, linkage including a main arm pivotally connected to the base, and being adjustable with respect to the base, means for securing the main arm in its positions of adjustment, a rod connected to the free end of the main arm, telescoping means for connecting the coupling to the rod, a spring disposed between the main arm and coupling normally holding the seat against movement with respect to the main arm, and a rod pivotally connected with the base and extending into the coupling, normally holding the seat against unrestricted vertical movement.

4. A tractor seat comprising a base for mounting on a tractor, said base embodying sections adjustable longitudinally with respect to each other, means for securing the sections against movement with respect to each other, a main arm pivotally and adjustably connected with one of the sections, means for securing the main arm in its positions of adjustment, a seat section, means for mounting the seat section for swinging movement vertically with respect to the arm, and spring means disposed between the seat and arm, normally restricting movement of the seat with respect to the main arm.

5. A tractor seat comprising a base for mounting on a tractor, said base having an arcuate shaped opening formed with notches in one edge thereof, a main arm pivotally mounted on the base, a pin extending transversely from the arm and being disposed in the arcuate shaped opening and engageable within a notch of the opening securing the arm in its position of adjustment with respect to the base, a seat section, a seat support including a telescoping link connecting the seat section with the arm, an expansible coiled spring disposed between the arm and seat section restricting movement of the seat section with respect to the main arm, and a rod having one of its ends extended into an opening of the seat support, the opposite end of the rod being pivotally connected with the base.

CHARLES GABEL.

REFERENCES CITED

The following references are of record in the file of this patent:

UNITED STATES PATENTS

| Number | Name | Date |
| --- | --- | --- |
| 1,777,463 | Dearing | Oct. 7, 1930 |
| 1,960,939 | Hansen | May 29, 1934 |
| 2,115,830 | Thiele | May 3, 1938 |

FOREIGN PATENTS

| Number | Country | Date |
| --- | --- | --- |
| 237 | Great Britain | Feb. 4, 1915 |